United States Patent Office 3,396,389
Patented Aug. 6, 1968

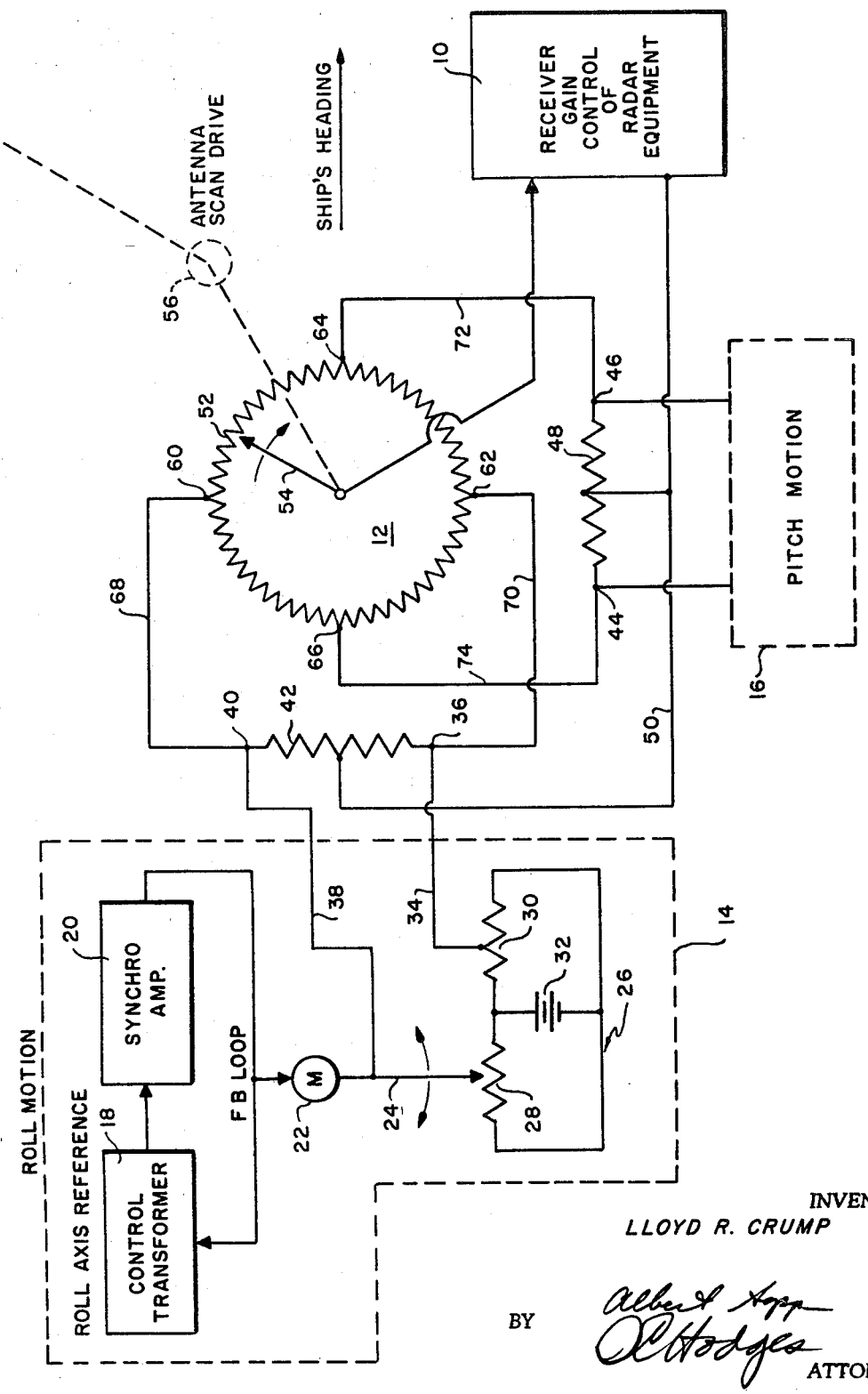

3,396,389
AUTOMATIC AND CONTINUOUSLY VARIABLE RADAR RECEIVER GAIN CONTROL
Lloyd R. Crump, Silver Spring, Md., assignor to the United States of America as represented by the Secretary of the Navy
Filed Sept. 28, 1967, Ser. No. 671,497
4 Claims. (Cl. 343—5)

ABSTRACT OF THE DISCLOSURE

A circular potentiometer resistor has first and second opposing pairs of contacts 180° apart which receive ship roll and pitch signals respectively. A potentiometer contact arm moves in unison with the azimuthal movement of a radar antenna and feeds gain control signals to the radar receiver. The control signals reduce receiver gain when the antenna is pointing downward and increase gain when the antenna is pointing upward.

---

The invention described herein may be manufactured and used by or for the Government of the United States of America for governmental purposes without the payment of any royalties thereon or therefor.

Background of the invention

Stabilization of a radar pedestal for ships and other vehicles is a major radar component cost and employs complex equipment requiring constant maintenance. Radar antenna stabilization also represents "above-the-deck" real estate of considerable weight. To harden the pedestal to meet air blast requirements adds further to the pedestal cost, space, and weight requirements. One of the primary reasons for stabilizing ship and vehicle-borne radar is to reduce sea or ground clutter caused by the propagated beam being directed toward the earth's surface.

To reduce "sea clutter," ship-borne radar utilizes, in addition to stabilization, sensitivity time control constant (STC) circuitry which reduces receiver gain at short ranges. However, STC in attenuating sea clutter also reduces detection capability of close-by targets. When STC is used on unstabilized antennas, target detection is further reduced when the antenna beam is shifted upward.

Summary

According to the present invention the problems and disadvantages of the prior art are overcome by providing an automatic and continuously variable radar receiver gain control circuit which compensates for the loss of low altitude target detection caused by high level sensitivity time control and the ship's roll and pitch motion. With the circuit of the present invention, the receiver gain is automatically and continuously increased when the antenna beam shift is upward to maintain low angle radar reception and when the antenna beam shift is toward the sea the receiver gain is automatically and continuously decreased to attenuate the return. Therefore, sea clutter or sea return can be eliminated without antenna stabilization and without an STC circuit. Optimum receiver sensitivity is maintained for all angles of antenna scan. Further, the present invention provides more uniform radar scope brightness for improved target display in that the dark scope center and its surrounding "halo" caused by programmed high level STC are substantially reduced.

The arrangement afforded by the present invention eliminates the need for expensive antenna pedestal stabilization and its accompanying weight above deck. For those antennas that must be stabilized for other reasons, the present invention affords a simple and inexpensive backup therefor, in addition to providing backup for STC circuitry.

Brief description of the drawing

Reference is now made to the drawing in which the single figure is a view in composite schematic and block diagram form of the automatic and continuously variable receiver gain system according to the invention.

Description of the preferred embodiment

In the single figure, the reference numeral 10 designates a receiver gain control circuit of the radar equipment to be controlled for sea clutter. Specific circuitry configurations for such a gain control are well known in the art and need not be described in detail. However, in general, it may be said that such gain control circuitry may include voltage polarity-responsive circuit elements whereby, for example, a positive polarity input of the receiver gain control is increased and for a negative input, the receiver gain control is decreased. Alternatively, receiver gain control circuitry may provide well known conventional circuit translation means by which differing polarity input signals are converted to voltage control signals of varying amplitude.

Continuously variable control signals for the receiver gain control unit 10 are provided by the potentiometer circuit generally designated by the numeral 12. Input signals representing roll motion and pitch motion respectively are fed to the potentiometer circuit 12 from a roll motion pickup unit 14, and from a pitch motion pickup unit 16 of identical construction to unit 14. Since, of course, as seen from an electronic circuit, pitch and roll signals are of the same nature, the circuit or signal pickup means to provide input for the circuit 12 need be described in detail only in relation to the roll motion unit 14.

In generator unit 14 a control transformer 18 receives a signal from a conventional stable platform. The output of the control transformer is an error signal which is fed to a servo amplifier 20 to drive a motor 22 having output motion means 24 displaceable in proportion to the number of degrees of roll motion of the ship.

The output motion means 24 also acts as an electrical contact arm. Alternatively, instead of the above described roll motion signal generator, a pendulum may be employed to operate as contact arm 24.

A voltage divider circuit 26 includes on its one side a resistor 28 for contact by control arm 24, and a resistor 30 on its other side. The voltage divider circuit 26 receives the output of a battery 32 connected across resistors 28 and 30 in the polarity shown so that as contact arm 24 moves to the left or "port" in the figure, the negative output appearing on contact arm 24 approaches the negative potential of battery 32. Likewise, movement of the contact arm 24 to the right or "starboard" increases the positive voltage appearing on contact arm 24.

The resistance 30 of the voltage divider circuit has a fixed center tap connected by a lead 34 to a "starboard" terminal 36 in the unit 12. The contact arm 24 is connected via a lead 38 to a "port" terminal 40 of the unit 12. Input points 36 and 40 of the unit 12 are connected by a resistor 42.

Input terminals 44 ("aft") and 46 ("forward") are provided for the pitch motion input device 16, it being understood that input contacts 44 and 46 of pitch motion device 16 would respectively correspond for purposes of explanation to roll and pitch motion contacts 40 and 36. A resistor 48 connects terminals 44 and 46. A common return lead 50 is connected at one end to receiver gain control unit 10 and is also connected to center tap positions of the respective resistors 42 and 48.

In the potentiometer circuit 12 a circular linear resistor 52 is contacted by a movable contact arm 54 which is driven in unison wtih the scanning rotation of a beam from a fixed or rotating antenna, as generally indicated by axial connection of arm 54 to a conventional antenna scan drive unit 56. The circular potentiometer circuit 10 is oriented in relation to the ship or vehicle heading as shown in the figure.

The resistor 52 has port and starboard contacts 60 and 62, respectively, 180° apart, and forward and aft contacts 64 and 66, respectively, 180° apart, and as a pair oriented 90° from contact pair 60, 62. A lead 68 connects contacts 40 and 60; a lead 70 connects contacts 36 and 62; a lead 72 connects contacts 46 and 64; and a lead 74 connects contacts 44 and 66.

*Description of the operation*

In operation, when the ship rolls to port, contact arm 24 moves to the left as shown in the figure, causing the negative going potential output on lead 38 to approach the negative potential of the battery 32 through resistor 28, and causing the positive voltage on lead 34 to increase in the positive direction. The resulting voltage output at contact 40 can be indicated as $-V$ and the action of divider circuit 26 produces a voltage at input terminal 36 of $+V$. It is understood that the polarity of the battery 32 may be reversed to produce opposite polarities throughout the circuit, without, however, affecting the working principle of the invention.

Because of the connection of the lead 50 to the center-tap points on respective resistors 42 and 48, the potential thereat is ground at all times in the operation of the circuit. Thus, the potential difference across potentiometer 52 between port contact 60 and starboard contact 62 is from $-V$ to $+V$, and the potential at contacts 64 and 66 is zero, and the potential difference between respective contacts 60 and 64 is $-V$, from 64 to 62 $+V$, from 62 to 66 $+V$, and from 60 to 66 $-V$. Consequently, during a roll to port with the arm 54 of the potentiometer in the azimuthal position as, shown in the figure, the receiver gain control receives an input thereto between zero and $-V$ volts in a manner directly proportional to the portside angle of the arm 54 to the ship's heading. Meanwhile, the amplitude of the voltages $-V$ and $+V$ is dependent upon the extent of roll of the ship to port in this instance. Therefore, the negative voltage produced on the contact arm 54 when positioned between contacts 60 and 64 represents a correction to be applied to reduce the receiver gain while the antenna is pointed to port and thus downward toward the sea.

As the contact arm rotates in the clockwise direction passing contact 64, the amplitude of the voltage appearing on arm 54 becomes zero and then as the arm 54 progresses from contact 64 to 62, assumes positive polarity voltage values. These positive polarity voltages will represent a correction to increase the receiver gain to compensate for shift of the antenna beam upward. Of course, it is obvious that for a portside roll as the arm 54 traverses past contact 62 the positive polarity voltage reaches its maximum amplitude and then decreases to zero at contact 66, finally rising to its maximum negative value again at contact 60.

When the ship pitches forward, for example, assuming the conventions of the voltage output of pitch motion device 16 is as shown, $-U$ designating a correction voltage for antenna pointing downward and $+U$ voltage for an antenna pointing upward, then the pitch motion generator 16 operating in the same manner as unit 14 provides a potential at forward contact 64 of $-U$ and at contact 66, of $+U$. Therefore, with the ship simultaneously pitching downward and rolling to port to an equal degree, the $-V$ and the $-U$ voltages will add so that when the contact arm 54 is midway between contacts 60 and 64, the negative voltage output fed through the contact arm 54 to the receiver gain control unit 10 will be at a maximum as represented by the quantity $-(V+U)/2$. That is, the voltages at various points throughout the potentiometer circle 52 will be arithmetically additive depending upon the position of the contact arm 54 representing the directional orientation of the antenna beam. For example, with the contact arm 54 located midway between contacts 62 and 64, and assuming that the degree of forward pitch is the same as the degree of port roll, then the voltage output sent to the receiver gain control unit would be zero, or, that is, $-U/2+V/2$, where $U=V$. Of course, if the absolute value of the voltage $-U$ exceeded that of $+V$, then the voltage sent to the receiver gain control unit 10 would be a negative voltage difference between $V$ and $U/2$.

Because the linear resistor 52 of the circular potentiometer 51 is configured in a continuous circle, then the successive values fed from contact arm 54 to the receiver gain control unit 10 continuously as the antenna sweeps through 360°, thus providing an accurate analog signal representing the sum effects of pitch and roll upon the ship for continuously controlling the gain in receiver 10.

The circuit of the present invention provides in effect the same corrected sea clutter signal as a stabilized antenna by virtue of the effect of the continuous control signal fed into receiver gain control unit 10.

The present invention also reduces degradation due to non-uniform scope gain and brightness caused by high level STC (low receiver gain). The low receiver gain for close range reception produces a dark scope center and the high gain for long range reception produces a surrounding bright halo. The circuit of this invention controls the receiver gain more uniformly to a range of approximately 15 miles which will provide uniform scope brightness. Since the receiver gain varies continuously, responsive to the output of unit 12, there will be no fixed signature for scope display.

Obviously many modifications and variations of the present invention are possible in the light of the above teachings. It is therefore to be understood that within the scope of the appended claims the invention may be practiced otherwise than as specifically described.

What is claimed is:

1. Apparatus for continuously adjusting the gain control in a radar receiver having its antenna mounted on a moving platform comprising:
    pickup means for sensing the motion of the platform to produce electrical signals representing deviation of the platform from horizontal;
    a potentiometer mounted on the moving platform and comprising a continuous length linear resistance element and a movable contact arm therefor, said contact arm being driven along said resistance element in unison with the azimuthal movement of the antenna beam;
    electrical coupling means coupling the output of said pickup means to predetermined pair of spaced-apart input contact points on said resistance element, said input contact points being located at positions corresponding to at least one axis about which the platform may move, whereby control signals appear on said rotating contact arm in accordance with both the azimuthal position of the antenna beam and with the deviation of the platform from horizontal; and
    means electrically connecting the movable contact arm to the gain control in the radar receiver whereby the control signals modify the gain control in accordance with platform orientation and azimuthal position of the antenna beam.

2. Apparatus according to claim 1 wherein said continuous length resistance element is circular in configuration.

3. Apparatus according to claim 2 wherein said pickup means comprises first and second motion sensing means for detecting deviations of the platform relative to two axes 90° from each other, and wherein said electrical coupling means comprises conductive means connecting said first motion sensing means to one pair of contact points spaced 180° apart on said resistance element and said second motion sensing means to a second pair of contact points spaced 180° apart and oriented 90° from a line connecting said first pair of contact points.

4. An electrical circuit for providing an output control signal proportional both to the degree of tilting of a platform about first and second perpendicular axes simultaneously and to the azimuthal position of a radar beam directed from an antenna mounted on the platform, said platform having first and second respective pickup means for sensing the motion of the platform to produce bi-polarity electrical signals representing the deviation of the platform from horizontal about the first and second axes, respectively, said electrical circuit comprising:

a potentiometer comprising a continuous linear resistance element of infinite length and a contact arm therefor movable in azimuth with the radar beam;

four contact points located at cardinal points of said resistance element, first and second electrically conductive means respectively connecting each opposing pair of contact points to said first and second pickup means respectively, receiving therefrom signals of opposing polarity;

resistance means connected across each of said first and second pickup means and in series with the respective opposing pair of contacts associated with each of said pickup means;

a common return connected to a centertap of each of said resistance means; and said potentiometer contact arm and said common return being adapted for connection to a utilization load for the electrical circuit.

References Cited
UNITED STATES PATENTS 3,178,679    4/1965    Wilkinson _____ 343—5
3,277,481   10/1966    Robin et al. _____ 343—5

RODNEY D. BENNETT, *Primary Examiner.*

C. L. WHITHAM, *Assistant Examiner.*